(12) United States Patent
Smith et al.

(10) Patent No.: US 8,989,247 B2
(45) Date of Patent: Mar. 24, 2015

(54) REDUCING SIGNAL DEGRADATION IN WIRELESS COMMUNICATIONS BASED ON TIME REVERSAL

(71) Applicant: Ziva Corporation, San Diego, CA (US)

(72) Inventors: David F. Smith, Ellicott City, MD (US); Anis Husain, San Diego, CA (US)

(73) Assignee: Ziva Corporation, San Diego, CA (US)

( * ) Notice: Subject to any disclaimer, the term of this patent is extended or adjusted under 35 U.S.C. 154(b) by 0 days.

(21) Appl. No.: 13/854,863

(22) Filed: Apr. 1, 2013

(65) Prior Publication Data
US 2013/0223503 A1 Aug. 29, 2013

Related U.S. Application Data

(63) Continuation of application No. 12/565,639, filed on Sep. 23, 2009, now Pat. No. 8,411,765.

(60) Provisional application No. 61/104,670, filed on Oct. 10, 2008.

(51) Int. Cl.
*H04B 3/46* (2006.01)
*H04L 25/02* (2006.01)

(52) U.S. Cl.
CPC .................................. *H04L 25/0212* (2013.01)
USPC ........................... 375/227; 370/292; 375/259

(58) Field of Classification Search
None
See application file for complete search history.

(56) References Cited

U.S. PATENT DOCUMENTS

| | | | | | |
|---|---|---|---|---|---|
| 5,155,742 | A | * | 10/1992 | Ariyavisitakul et al. | 375/231 |
| 6,128,351 | A | * | 10/2000 | Jones et al. | 375/284 |
| 6,490,469 | B2 | * | 12/2002 | Candy | 600/407 |
| 6,834,043 | B1 | * | 12/2004 | Vook et al. | 370/310 |
| 6,980,140 | B1 | * | 12/2005 | Rowland et al. | 341/118 |
| 7,254,171 | B2 | * | 8/2007 | Hudson | 375/229 |
| 7,317,767 | B2 | * | 1/2008 | Happonen et al. | 375/319 |
| 7,362,815 | B2 | * | 4/2008 | Lindskog et al. | 375/264 |
| 7,460,605 | B2 | * | 12/2008 | Candy et al. | 375/259 |
| 7,463,690 | B2 | * | 12/2008 | Candy et al. | 375/259 |
| 7,471,734 | B2 | * | 12/2008 | Thomas et al. | 375/295 |
| 7,496,165 | B2 | * | 2/2009 | Schur et al. | 375/346 |
| 7,519,019 | B2 | * | 4/2009 | Yoon et al. | 370/328 |
| 7,532,692 | B2 | * | 5/2009 | Hwang | 375/350 |
| 7,535,409 | B1 | * | 5/2009 | Choe et al. | 342/159 |
| 7,561,643 | B1 | * | 7/2009 | Piirainen | 375/346 |
| 7,619,964 | B2 | * | 11/2009 | Son et al. | 370/210 |
| 7,653,137 | B2 | * | 1/2010 | Fink et al. | 375/259 |
| 8,027,407 | B2 | * | 9/2011 | Papadopoulos | 375/299 |
| 8,064,507 | B1 | * | 11/2011 | Cheng et al. | 375/224 |
| 8,072,842 | B2 | * | 12/2011 | Dahl et al. | 367/135 |
| 8,121,182 | B2 | * | 2/2012 | Allpress et al. | 375/229 |
| 2002/0031104 | A1 | * | 3/2002 | Griffith et al. | 370/329 |
| 2003/0138053 | A1 | * | 7/2003 | Candy et al. | 375/259 |
| 2004/0014498 | A1 | * | 1/2004 | Grego | 455/561 |
| 2004/0085917 | A1 | * | 5/2004 | Fitton et al. | 370/292 |
| 2005/0013391 | A1 | * | 1/2005 | Boer et al. | 375/340 |
| 2005/0128966 | A1 | * | 6/2005 | Yee | 370/310 |
| 2005/0159184 | A1 | * | 7/2005 | Kerner et al. | 455/558 |

(Continued)

*Primary Examiner* — Adolf Dsouza
(74) *Attorney, Agent, or Firm* — Perkins Coie LLP

(57) ABSTRACT

Techniques, apparatus and systems for providing radio frequency wireless communications based on time reversal of the channel impulse response of an RF pulse in a transmission channel between an RF transmitter and an RF receiver to enhance reception and detection of an RF pulse at the RF receiver against various effects that can adversely affect and complicate the reception and detection of the RF pulse at the RF receiver.

11 Claims, 7 Drawing Sheets

(56) References Cited

U.S. PATENT DOCUMENTS

| | | | |
|---|---|---|---|
| 2006/0098746 A1* | 5/2006 | Candy et al. | 375/259 |
| 2006/0215539 A1* | 9/2006 | Vrcelj et al. | 370/208 |
| 2006/0245349 A1* | 11/2006 | Vrcelj et al. | 370/210 |
| 2006/0268812 A1* | 11/2006 | Wilson et al. | 370/346 |
| 2008/0159377 A1* | 7/2008 | Allpress et al. | 375/233 |
| 2008/0219334 A1* | 9/2008 | Brainos et al. | 375/221 |
| 2009/0110044 A1* | 4/2009 | Wu et al. | 375/231 |
| 2009/0168739 A1* | 7/2009 | Kim et al. | 370/342 |
| 2009/0285323 A1* | 11/2009 | Sundberg et al. | 375/267 |
| 2009/0301198 A1* | 12/2009 | Sohn et al. | 73/598 |
| 2010/0020996 A1* | 1/2010 | Elmedyb et al. | 381/318 |
| 2010/0054322 A1* | 3/2010 | Hui et al. | 375/232 |
| 2010/0067629 A1* | 3/2010 | Gaddam et al. | 375/346 |
| 2010/0085902 A1* | 4/2010 | Phan Huy et al. | 370/280 |
| 2011/0003606 A1* | 1/2011 | Forenza et al. | 455/501 |
| 2011/0286508 A1* | 11/2011 | Smith et al. | 375/224 |
| 2011/0311004 A1* | 12/2011 | Maruta | 375/344 |
| 2012/0032855 A1* | 2/2012 | Reede et al. | 342/458 |

* cited by examiner

REDUCING SIGNAL DEGRADATION IN WIRELESS COMMUNICATIONS BASED ON TIME REVERSAL

PRIORITY CLAIM AND RELATED PATENT APPLICATIONS

This application is a continuation application of U.S. patent application Ser. No. 12/565,639 entitled "TECHNIQUES AND SYSTEMS FOR WIRELESS COMMUNICATIONS" and filed on Sep. 23, 2009, which claims benefit of priority of U.S. Provisional Patent Application No. 61/104,670 entitled "TECHNIQUES AND SYSTEMS FOR WIRELESS COMMUNICATIONS" and filed on Oct. 10, 2008. The entire contents of the above-referenced patent applications are incorporated by reference as part of the disclosure of this application.

TECHNICAL FIELD

The subject matter described in this document relates to radio frequency wireless communications.

BACKGROUND

Radio frequency (RF) wireless communications use wireless transfer of RF waves to communicate and transfer information and can be used in a wide range of applications. For example, RF wireless communications can be used to provide interactive broadband access for data and file transfer, GPS services, web surfing, video capture, streaming video, Internet commerce, Internet gaming, and electronic books. Other examples for applications of RF wireless communications include radar, RF imaging, space communications, RF targeting, RF sensor networks, RF surveillance, and various uses of wirelessly directing RF waves from one location to another. Some specific uses of RF wireless communications are static and mobile RFIDs, inventory tracking and control, and security monitoring at security checkpoints such as airports and shipping ports.

RF wireless signals can be transmitted between two communication nodes through a transmission channel. The transmission channel includes the electronics and antennas of an RF transmitter at the first node. The actual transmission medium is also part of the transmission channel, including various objects which reflect or scatter the wireless RF signals. Also part of the transmission channel are the electronics and antennas of an RF receiver at the second node. Interactions, such as reflecting and scattering, with any encountered objects which are part of the transmission channel can affect the transmission of the wireless RF signal to the RF receiver and the detection of the received wireless RF signal at the RF receiver.

SUMMARY

The techniques, apparatus and systems described in this document are based on time reversal of the channel impulse response of an RF pulse in a transmission channel between an RF transmitter and an RF receiver and can be implemented in ways to enhance reception and detection of an RF pulse at the RF receiver against various effects that can adversely affect and complicate the reception and detection of the RF pulse at the RF receiver.

A radio frequency (RF) wireless communication system includes a first wireless transceiver at a first location to transmit and receive wireless RF signals. The first wireless transceiver includes a monitor pulse transmitter to wirelessly transmit periodic monitor RF pulses for monitoring a transmission channel in which a wireless RF signal produced by the first wireless transceiver propagates. The first wireless transceiver also includes a signal receiver that receives wireless RF signals for extracting data or information in the received wireless RF signals.

In one aspect, an RF system includes a second wireless transceiver at a second location separate from the first location to transmit and receive wireless RF signals in wireless communications with the first wireless transceiver, the second wireless transceiver comprising. The second wireless transceiver includes a monitor pulse receiver to receive and detect the monitor RF pulses from the first wireless transceiver. The second wireless transceiver also includes a signal transmitter that transmits wireless RF signals with RF pulses carrying data or information to be transmitted to the first wireless transceiver.

The system also includes a transmission control circuit that processes one or more received monitor RF pulses from the first wireless transceiver to produce a time reversal of an impulse function of the one or more received monitor RF pulses. The transmission control circuit also multiplexes each RF pulse carrying data or information to be transmitted with the time reversed impulse function as part of each wireless RF signal to be transmitted out by the signal transmitter.

In another aspect, an RF system for providing RF communications includes a target and a base in communication with the target. The target has a target-transmitter to repeatedly emit RF impulse-pulses and a target-receiver to detect RF data signals. The base includes a base-detector to detect a channel impulse response of the RF impulse-pulses emitted by the target. The base-detector has an analog-to-digital converter to digitize the detected channel impulse response into a detected channel impulse response waveform having a preset number of samples. The base also includes a waveform processing unit. The waveform processing unit includes a temporary memory configured to store the detected channel impulse response waveform and a first memory configured to store and reverse in time domain a previously detected channel impulse response waveform. The waveform processing unit also has a comparator unit to quantify a difference between the channel impulse response waveform in the temporary memory and the channel impulse response waveform in the first memory, and a switch to replace the channel impulse response waveform stored in the first memory with the channel impulse response waveform stored in the temporary memory. The quantified difference is compared against a predefined threshold. The base further includes a multiplexer that adds a copy of the time reversed channel impulse response waveform from the first memory at the beginning of each bit of an RF data stream to produce an output signal, and a transmitter to emit the output signal.

In yet another aspect, a method for providing RF wireless communications includes obtaining a channel impulse response for an RF communication system. To obtain the channel impulse response the target repeatedly emits impulse-pulses which are then detected at a base as the channel impulse response associated with the target. Next the detected channel impulse response is digitized into a channel impulse response waveform, and stored in a temporary memory. The method also includes monitoring the obtained channel impulse response. The monitoring includes quantifying a difference between a channel impulse response waveform stored in a first memory and the channel impulse response waveform stored in the temporary memory. When the quantified difference is greater than a predefined threshold, then the channel impulse response waveform stored in the first memory is replaced with the channel impulse response waveform stored in the temporary memory. Then, the target is instructed to emit the impulse-pulses more often. When the quantified difference is less than a predefined threshold the target is instructed to emit the impulse-pulses less often.

The method further includes transmitting an RF data stream by using the monitored channel impulse response. The transmitting includes retrieving the stored channel impulse response waveform from the first memory. The waveform is retrieved in last-in-first-out order. Then a signal is prepared for transmission by adding a copy of the retrieved channel impulse response waveform at the beginning of each bit of an RF data stream. The prepared signal is emitted from the base and the RF data stream is detected at the target.

In another aspect, an RF wireless communication method includes emitting from a target an impulse-pulse and detecting at a base a channel impulse response associated with the emitted impulse-pulse. The method further includes digitizing the detected channel impulse response into a channel impulse response waveform and storing the channel impulse response waveform in a memory at the base. An RF data stream transmission, using the monitored channel impulse response, includes reversing in time domain the channel impulse response waveform from the memory, then preparing a signal for transmission by adding a copy of the time reversed channel impulse response waveform at the beginning of each bit of an RF data stream, and finally emitting the prepared signal from the base. Next, the method includes detecting the RF data stream at the target. When a parameter of system performance is less than a first threshold another impulse-pulse is emitted from the target. The parameter of system performance can be a bit-to-error-ratio of the detected RF data stream at the target.

BRIEF DESCRIPTION OF DRAWINGS

These and other aspects will now be described in detail with reference to the following drawings.

Like reference symbols in the various drawings indicate like elements.

DETAILED DESCRIPTION

Figure 1:
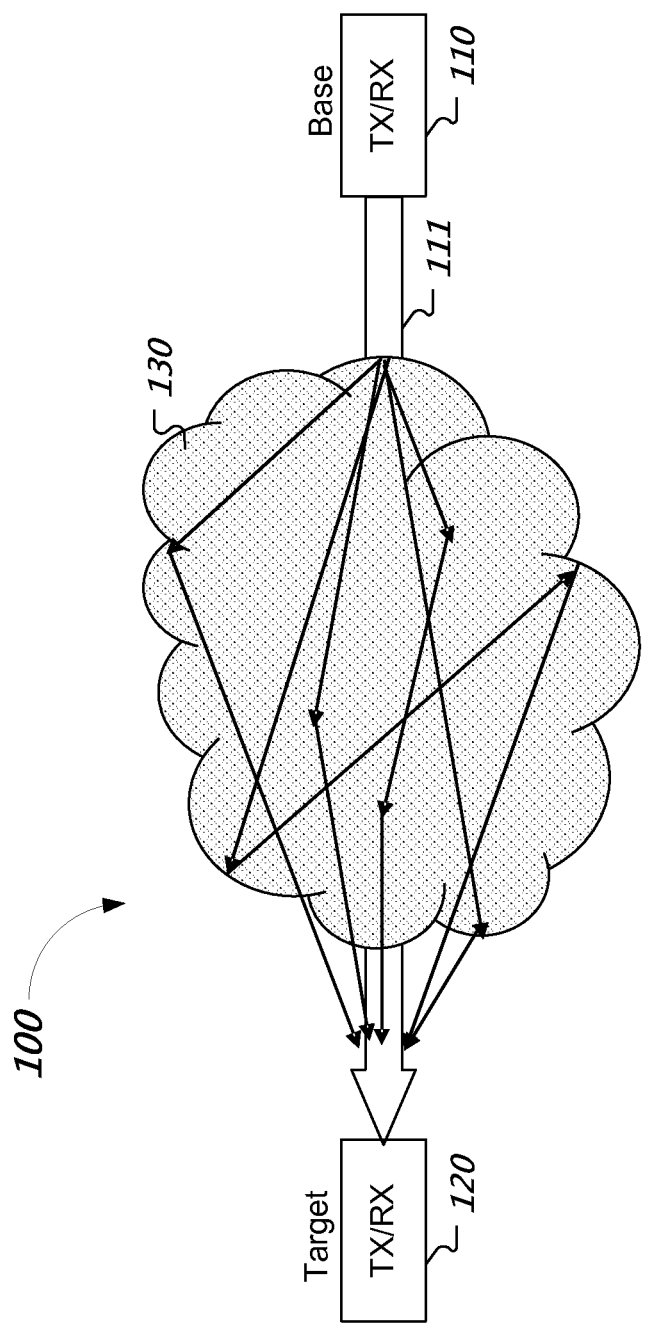
FIG. 1 represents an RF wireless communications system including a target and a base.

An RF wireless communication signal can be affected by various effects during transmission, such as multipath scattering and reflections. These effects can cause the RF energy of a short pulse or other coded sequence generated at a first location, e.g., an RF transmitter, to arrive at a second location, e.g., an RF receiver, over a period of time longer than the original pulse duration.

The pulse can be emitted from a first antenna at the first location and received by a second antenna at the second location. The RF wave of the pulse can interact with different objects and such interactions cause different portions from the original RF wave to travel along different paths. The portion of the RF wave that travels along the line of sight between the two antennas in a homogeneous medium arrives at the second location before arrival of other portions of the RF wave. Other portions of the RF wave are detected by the antenna at the second location after these portions of the RF wave are scattered or reflected towards the second location by various objects in the transmission channel. Such different portions of the RF wave may have different signal strengths. This presence of different portions of the same RF wave from the original RF pulse with different signal strengths and different arrival times at the second antenna renders the detection of the RF pulse difficult. For example, the addition of contributions from various scattering paths results in a long pulse detected by the second antenna at the second location that may overlap in time with one or more subsequent RF pulses in a sequence of RF pulses generated and transmitted by the first antenna at the first location. The waveform of such a long pulse detected by the second antenna may also be distorted due to different signal strengths of the different portions. In some cases, the detected RF signals at the second antenna may appear completely random and cannot be easily processed to recognize different RF pulses generated by the first antenna.

Delays can also result from a signal taking different amounts of time to propagate between the terminals of an antenna and different physical locations on the antenna. These delays are referred to as dispersion to distinguish them from multipath delays.

The detected waveform at the second antenna for the short pulse transmitted by the first antenna, however, could be returned through the transmission channel to arrive back at the first location as a short pulse, if each of the different portions of the RF wave received at the second antenna is reversed in time and is directed back to the first antenna along their paths from the first antenna to the second antenna. The antenna at the second location emits the trailing portions of the detected signal first, while the leading portions of the signal are emitted last. Due to the time reversal properties of RF-wave propagation only the respective portions of the RF wave which travel through the transmission channel along the original paths can arrive in phase at the first location. Moreover, because the return paths coincide with the forward paths, all portions of the waveform emitted from the second location arrive at the first location at the same time after applying the delays associated with the time reversal process. Therefore, the antenna at the second location emits a time reversed signal and effectively produces a pulse that is focused in time and space. In this context, the focusing in the time domain consists of shortening the time duration of the pulse emitted from the second location to the time duration of the pulse emitted originally from the first location. The spatial focusing consists of emitting an RF wave from the second location and concentrating a portion of the RF wave energy at the first location. Note that the spatial focusing technique described in this document is accomplished by time reversed emission creating identical conditions as a directional antenna array, but does not require beam shaping elements.

If the antenna at the second location emits the time reversed signal repeatedly, a sequence of RF pulses can be detected at the first location. Therefore, time reversal of RF waves can be used to establish RF communications between the antenna at the second location and the antenna at the first location. The antenna at the second location focuses a sequence of pulses at the first location using time reversal emission, thus compensating for noise due to scattering, multipath and dispersive effects. An identical process can be applied to transmit data in the reverse direction.

The techniques, apparatus and systems described in this document apply the time reversal of the channel impulse response of the transmission channel through which the RF energy transfers from the first antenna and to the second antenna in transmitting a short RF pulse from the first antenna to the second antenna. The signal received at the second antenna has been transformed from a short RF pulse and represents the impulse response of the transmission channel. This signal received from the first antenna contains multiple portions of the short RF pulse that traveled along different signal paths towards the second antenna. The signal representing the impulse response of the transmission channel is time reversed and transmitted by the second antenna back to the first antenna. Due to the time reversal property, the multiple portions of the transmitted impulse response of the transmission channel retrace the different signal paths back to the first antenna. The multiple portions of the transmitted impulse response of the transmission channel arrive at the first antenna within a pulse duration (of the original short RF pulse) from one another to form the short RF pulse.

Once an RF transmission based on time reversal is established, the reception quality can be maintained if no changes occur in the transmission channel. For example, new scattering centers present in the transmission channel and other changes in the transmission channel can alter the scattering paths of the RF wave emitted by the antenna at the second location. Modifications of the transmission channel can also be due to changes in the location or properties of the first or second antennas.

As a result, portions of the RF wave emitted at the second location do not return in phase at the first location. The signal-to-noise ratio (SNR) of the pulse reception degrades because part of the energy of the pulses received back at the first location is lost to noise. To avoid degradation of the SNR of the pulse reception at the first location the response of the transmission channel can be monitored and timely updated to reflect the current transmission condition of the transmission channel. The techniques, apparatus and systems described in this document based on the time reversal approach can be implemented to include a monitoring mechanism for monitoring changes in the transmission channel or the location of the end points, and a mechanism for updating the channel impulse response of the transmission channel to account for changes in the transmission channel such as appearance of new scattering objects and disappearance of previously existing scattering objects.

Effect of Channel Impulse Response on Data Transmission

FIG. 1 illustrates a wireless RF communication system 100 that is subject to multipath scattering and other effects in the transmission channel on the signal reception. The base 110 and the target 120 associated with the communication system 100 in FIG. 1 are each equipped with a transmitter (TX) and a receiver (RX). The base 110 transmits a data encoded signal 111 to the target 120. The terms data encoded signal and signal are used interchangeably in the following description. The signal 111 transmitted from the base 110 to the target 120 undergoes scattering from various objects on the line-of-sight and non-line-of-sight paths. The signal received at the target 120 includes interference contributions due to, for example, multipath scattering and dispersion delays. Thus, the signal received at the target 120 has a time duration longer than that of the signal 111 provided at the base 110. The signal 111 emitted by the transmitter at the base 110 is denoted s(t). The signal detected by the receiver at the target 120 is denoted q(t), and includes two contributions:

$$q(t)=s(t)*h(t)+n(t) \quad (1)$$

The first term in EQ. 1 corresponds to the convolution between the signal s(t) and the channel impulse response h(t) of the transmission channel. The second term n(t) represents random noise. Random noise can be caused by, for example, a detection or measurement error. Therefore, the random noise term n(t) in EQ. 1 is independent of the transmission path.

The transmission channel includes the entire medium 130 between the base 110 and the target 120, including areas out of the line of sight from the base 110 to the target 120. The channel impulse response h(t) depends on the characteristics of the transmission channel. Namely, the number of scattering objects, their placement and orientation with respect the line of sight from the base 110 to the target 120, can all influence the channel impulse response. Many scattering centers cause many scattering paths, thus lengthening the time duration of the channel impulse response h(t) and implicitly of the received signal q(t). Scattering objects placed far away from the line of sight cause long scattering paths, thus again, lengthening the time duration of h(t) and q(t). On the other hand, if the transmission path does not contain scattering centers and the electronics is optimized, then the channel impulse response due to the path is close to unity, h(t)=1, and the signal q(t) received at the target 120 resembles very well the signal s(t) 111 emitted at the base 110. In the absence of scattering events, the signal detected by the receiver at the target 120 does not have a longer time duration than the signal 111 emitted by the base 110.

In the wireless RF communication system 100 the transmitter at the base 110 has no knowledge of the channel impulse response prior to transmitting RF signals from the base 110 to the target 120. Therefore, the discrimination and equalization processes needed to extract data from the transmitted signal 111 is performed by the receiver at the target 120. From the perspective of the target 120, both the channel impulse response h(t) and the random noise n(t) represent random processes and are difficult to separately account for.

Time Reversal of Channel Impulse Response

As described earlier, the effects on signal propagation by multipath scattering in the transmission channel 130 can be corrected by time reversal. A pulse submitted from the target 120 is detected by the base 110 after propagation through the transmission channel 130. The detected pulse experiences the effect of the transmission channel 130, therefore the base 110 knows the response of the medium to the propagation of an impulse. Thus, the waveform detected by the base 110 is the channel impulse response h(t) characteristic to the transmission channel 130. For reasons discussed above, if the time reversed channel impulse response h(T−t) is reemitted by the base 110, the pulse arriving back at the target 120 is approximately the original impulse pulse. Therefore, the time reversed channel impulse response matches and negates the effects of the multipath scattering in the propagation medium 130. The convolution between the channel impulse response h(t) and the time reversed channel impulse response h(T−t) is given approximately by the impulse (delta) function:

$$h(t)*h(-t)=\delta(t) \quad (2)$$

The signal s(t) 111 is generated by the transmitter at the base 110. If instead of emitting the signal s(t) 111, the base 110 emits a signal containing the convolution s(t)*h(T−t), then the signal received at the target 120 is given approximately by $$q(t)=[s(t)*h(-t)]*h(t)+n(t)$$

$$q(t)=s(t)*[h(-t)*h(t)]+n(t)=s(t)*\delta(t)+n(t) \qquad (3)$$

As suggested by EQs. 2-3, the signal q(t) detected at the target 120 has been filtered by the transmission channel 130. The signal emitted at the base 110 now contains the time reversed channel impulse response h(T−t), where T represents a time delay to preserve causality of the signal. The time delay T is related to the time it takes the base 202 to receive and reverse in the time domain the signal corresponding to the channel impulse response h(t). As discussed above, the effect of the time reversed channel impulse response h(T−t) is to match and negate the contribution of the channel impulse response h(t). Thus, the effect of the multipath scattering in the transmission channel 130 is cancelled and the signal detected by the receiver at the target 120 is a close replica of the signal s(t) 111 included in the signal emitted by the transmitter at the base 110. To establish an RF wireless transmission based on time reversal, the time reversed channel impulse response h(T−t) of the transmission channel 130 can be measured and implemented as shown in EQ. 3.

Acquisition and Time Reversal of Channel Impulse Response

Figure 2:
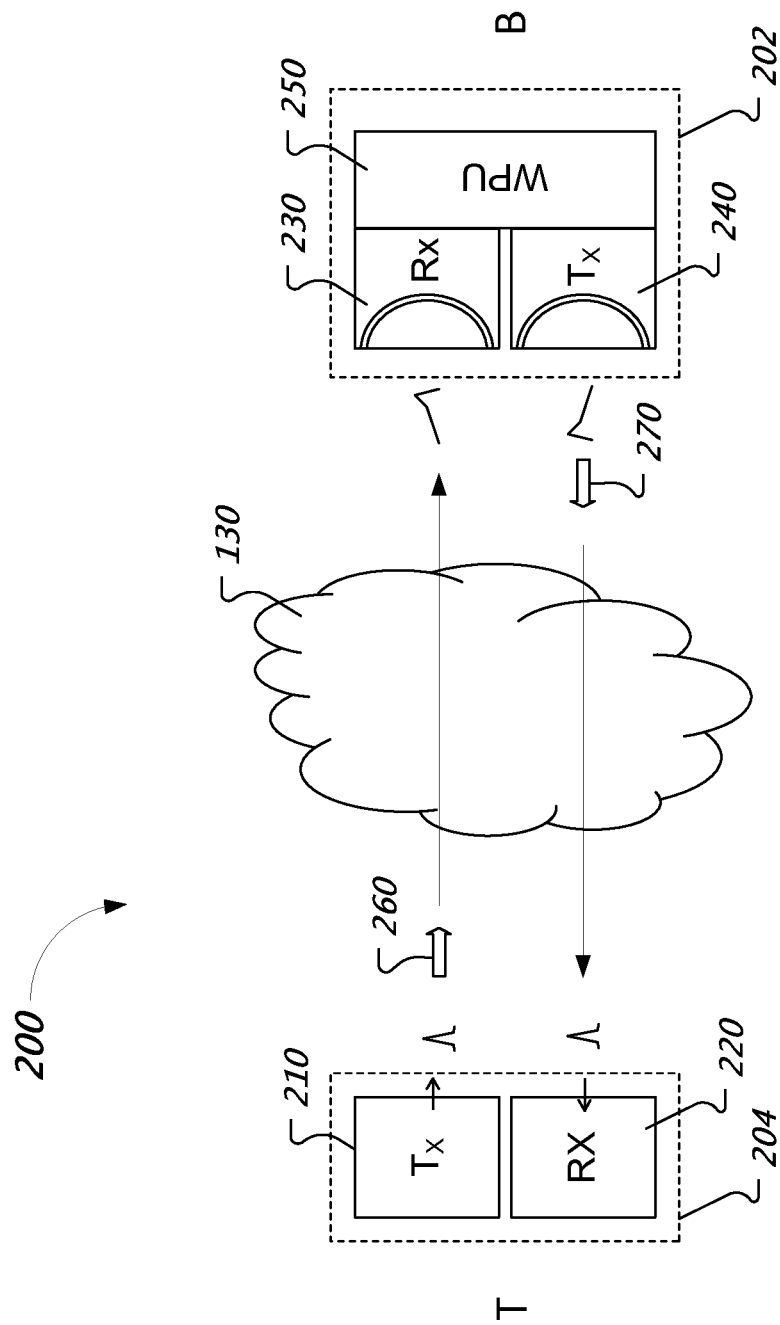
FIG. 2 represents another RF wireless communications system including a target and a base.

The RF wireless communication system 200 shown schematically in FIG. 2 can be configured to include circuit elements and devices that detect, digitize and store the channel impulse response h(t). The system 200 includes a base 202 and a target 204 which exchange signals through a transmission channel 130. For the remainder of this document the terms base and target (or interchangeably remote node) are used to denote the following types system nodes: A base station is a centrally located and high functional communication node. A target may have less functionality than the base station but may be more mobile.

The target 204 is equipped, among other things, with a target-TX 210 and a target-RX 220. The target-TX 210 emits an impulse pulse 260. The impulse pulse 260 can be a delta pulse, or any other shape of pulse that allows the different paths from the target 204 to the base 202 via different scatterers to be uniquely resolved in the channel impulse response h(t). This impulse pulse 260 passes through the medium 130, interacting with scattering and multipath elements and arrives at the base 202. The base 202 includes a base-RX 230, a base-TX 240, and a waveform processing unit 250. The pulse 260 emitted by the target 204 is detected by the base-RX 230 in the form of the channel impulse response h(t) of the transmission channel 130.

The waveform processing unit 250 digitizes the channel impulse response h(t) in a high speed sampling circuit and, in one implementation, the base 202 stores the channel impulse response waveform h(t). The waveform processing unit 250 then reverses in time domain the channel impulse response waveform h(t) to generate a time reversed channel impulse response waveform h(T−t) 270. The waveform processing unit 250 is described in more detail with respect to FIG. 4. In another implementation, in addition to the channel impulse response waveform h(t), the time reversed channel impulse response waveform h(T−t) may also be stored in the waveform processing unit 250. In yet another implementation, only the time reversed channel impulse response waveform h(T−t) 270 is stored in the waveform processing unit 250, and not the channel impulse response waveform h(t). In one aspect, the waveform processing unit 250 stores the channel impulse response waveform h(t) in a last-in-first-out (LIFO) buffer. Therefore, the time reversal step is built in as a property of the LIFO buffer: the channel impulse response waveform h(t) goes into the LIFO buffer for storage, and the time reversed channel impulse response waveform h(T−t) 270 comes out of the LIFO buffer upon accessing the buffer.

Upon receiving the signal from the target 204, the base-TX 240 can emit the stored time reversed channel impulse response h(T−t) 270. Assuming that the medium is linear and reciprocal, the signal emitted at the base 202, consisting of the time reversed channel impulse response h(T−t) 270, arrives at the target 204 with all transmission degradations removed, as shown in EQ. 2. The target-RX 220 detects a pulse that resembles the original impulse pulse 260. As discussed regarding EQ. 2, the original temporal shape of the pulse 260 is preserved upon return to the target 204.

In one exemplary implementation of the communication system 200, the target-TX 210 and the base-TX 240 are configured to emit analog signals, while the base-RX 230 is configured to receive analog signals. In contrast the target-RX 220 can be configured to receive digital signals. In another exemplary implementation of the communication system 200, the target-RX 220 can be configured to receive analog signals.

In yet another exemplary implementation of the communication system 200 the target-TX 210 and the base-TX 240 are configured to emit digital signals, while the base-RX 230 and the target-RX 220 are configured to receive digital signals.

In another aspect, impulse signals can also be transmitted by the base station 202 and data signals can also be transmitted by the target 204. Such a configuration enables impulse and data signal flow in both directions. This document describes impulse signals transmitted by the target 204 and data signals transmitted by the base station 202 only for illustrative processes.

Temporal and spatial focus are obtained for the RF wireless communications system 200. The pulse 260 emitted by the target 204 as an RF wave is reflected back by the base 202 after time reversal. The reflected and time reversed pulse return precisely at the target 204 location, because only at the target 204 location the waves scattered within the transmission channel 130 add up in phase, both spatially and temporally.

Data Transmission from Base to Single Target

Once the channel impulse response h(t) of the transmission channel 130 was determined and the time reversed channel impulse response waveform h(T−t) stored by the base 202, the RF wireless communication system 200 can be configured for data transmission. In this implementation, a data channel is integrated into the base-TX 240 of the RF wireless communication system 200.

Figure 3:
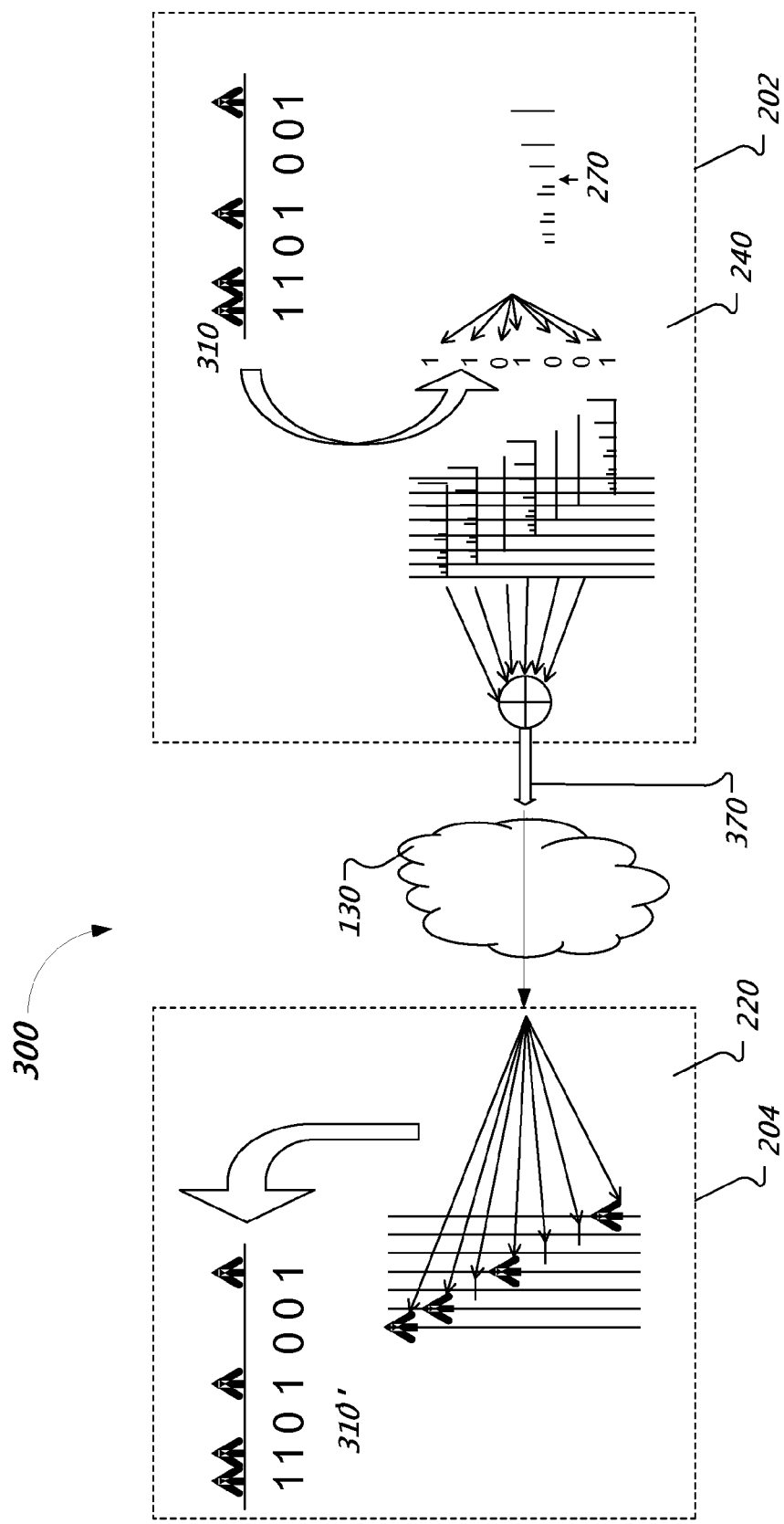
FIG. 3 is a schematic illustrating an RF wireless transmission between a target and a base.

FIG. 3 depicts a procedure to integrate the time reversed channel impulse response waveform h(T−t) 270 into the data channel. A data stream s(t) 310, for example, a digit sequence of 1101001, can be sent from the base 202 to the target 204. The data stream s(t) 310 intended to arrive at the target 204 is convolved with the time reversed channel impulse response h(T−t) 270. The time reversed channel impulse response h(T−t) 270 has been stored at the base 202 inside the waveform processing unit 250. The base-TX 240 transmits a copy of the time reversed channel impulse response h(T−t) 270 for each data bit, as shown in FIG. 3. In an exemplary implementation, a one bit is encoded by emission of a copy of the time reversed channel impulse response h(T−t) 270. A zero bit results when no copy of time reversed channel impulse response h(T−t)

270 at all is sent back, such that there are no waves to align when a zero returns to the target 204. In another implementation, a zero bit is encoded by emission of a modified copy of the time reversed channel impulse response h(T−t) 270.

Furthermore, ones and zeroes can be coded by different amplitude assignments. Ones and zeroes can also be coded by time, frequency, phase or scale modulation.

The temporal length of a bit can have various lengths, depending on the RF communications application. For example, for data rates of order gigabit per second, each bit may be of order 1 ns. The temporal length of the channel impulse response h(t) for a wireless communications system 300 characterized by severe multipath scattering is arbitrary since it depends on the configuration of the physical environment. The time duration of h(t) can be of order 200 ns or more. The sampling frequency is usually two times the maximum frequency of the impulse response. For a 1 nsec impulse and a 1000 nsec channel impulse response h(t), the sampling frequency would typically be set at 2 GS/s resulting in a total of 2000 samples. The base-TX 240 can transmit all or part of the time reversed channel impulse response h(T−t) 270. In certain implementations, the base-TX 240 can modify the time reversed channel impulse response h(T−t) 270, by using DSP techniques, prior to transmission to the target 204.

Copies of time reversed channel impulse response h(T−t) 270 are time-multiplexed 320 in a prepared data stream signal based on an appropriate bit boundary synchronization, as illustrated in FIG. 3. Because the time reversed channel impulse response h(T−t) 270 is longer than the time between bits, the multiple delayed copies of the time reversed channel impulse response h(T−t) 270 are added before the transmission. In one implementation, the summation is performed digitally before the signal reaches analog circuitry of the base-TX 240. In another implementation, the summation is performed by analog circuitry of the base-TX 240.

The data stream signal starts at the base 202 as an output signal 370, prepared as described above, traverses the multipath transmission channel 130 and arrives at the target 204 as a stream of bits 310' corresponding to s(t), for example, 1101001. The respective copy of time reversed channel impulse response h(T−t) 270 corresponding to each bit at the base 202 has been matched and filtered during propagation from the base 202 to the target 204, as described by EQs. 2 and 3. The target-RX 220 detects the RF data stream signal s(t) 310', free of the inter-symbol interference caused by the multipath transmission channel 130.

Monitoring Changes of Channel Impulse Response

RF communication systems based on time reversal can be operated to exhibit the functionality illustrated in FIGS. 2-3 when the channel impulse response h(t) of the transmission channel 130 does not change in time. Changes caused by new or modified scattering sources in the transmission channel 130 lead to a decrease in the SNR of the detected signal. As discussed earlier, monitoring the channel impulse response h(t) of the transmission channel 130 allows for timely replacement of the channel impulse response waveform h(t) when new or modified scattering sources are introduced in the transmission path 130.

Figure 4:
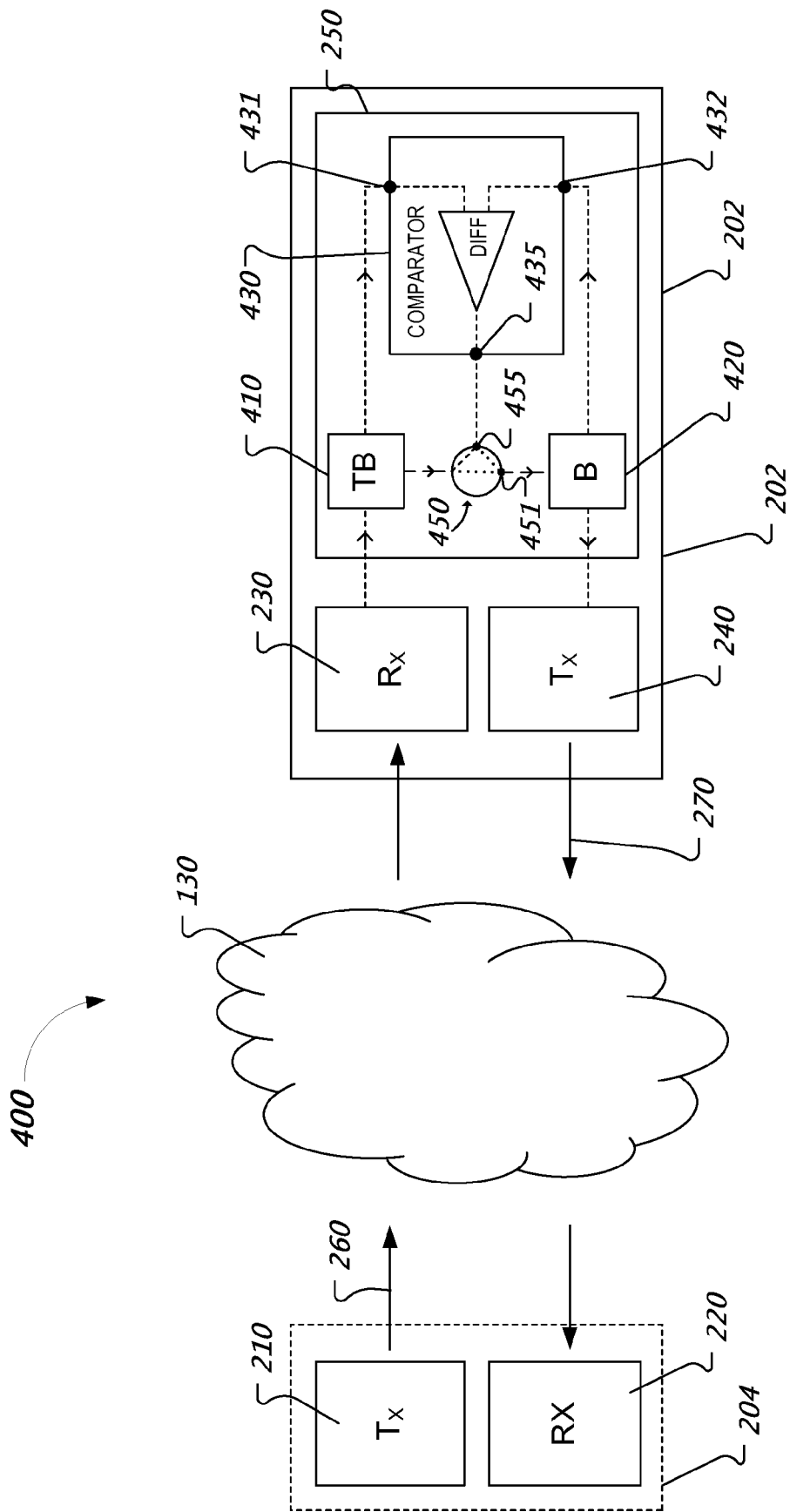
FIG. 4 is a schematic illustrating yet another RF wireless communications system including a target and a base.

FIG. 4 illustrates a system to monitor the quality of a time reversal based communication system 400 when changes in channel impulse response are due to dynamic changes of the transmission path. The system 400 is characterized by two parallel signal exchange paths. A data communication path which was described in detail regarding FIG. 3. And an impulse-response monitoring path that is presented below.

The data communication path of the RF wireless communication system 400 includes the base-TX 240 at the base 202, and the target-RX 220 at the target 204. The preparation of the data stream signal convolved with the time reversed channel impulse response waveform is performed by the base-TX 240 as shown in FIG. 3. The output signal 370 containing the data stream is emitted by the base-TX 240 and arrives at the target 204 through the transmission channel 130. As shown in regard to FIG. 3, an equalized data stream is received by the target 204 as predicted by EQ. 3. The equalized signal is enhanced with respect to noise and interference.

The impulse-response monitoring path of the RF wireless communication system 400 includes a target-TX 210. An impulse-pulse 260 is emitted by the target-TX 210 towards the base 202 through the transmission channel 130. The target 204 repeatedly emits impulse-pulses to ensure that the base 202 has an impulse response h(t) that best represents the existing transmission channel 130. The time interval between consecutively emitted impulse-pulses is short if the transmission channel 130 changes rapidly. The time interval between consecutively emitted impulse-pulses is long if the transmission channel 130 changes slowly.

The base 202 is equipped, among other things, with a base-RX 230, a base-TX 240, and a waveform processing unit 250. The impulse-pulse 260 emitted by the target 204 is received by the base-RX 230. The received signal, representing the channel impulse response h(t) of the transmission channel 130, is input into the waveform processing unit 250.

The waveform processing unit 250 includes a temporary buffer 410, a buffer 420, a comparator unit 430, and a switch 450. The buffer 420 can be operated in first-in-first-out (FIFO) mode or in LIFO mode. The temporary buffer 410 can be operated in FIFO mode. In other implementations, the buffers 410 and 420 can be replaced by different regions of digital memory. The channel impulse response h(t) is digitized and the channel impulse response waveform h(t) is placed into the temporary buffer 410. The buffer 420 stores a previously acquired channel impulse response waveform H(t). The notation convention is that lower case denotes the most recently acquired waveform, while upper case denotes a previously acquired waveform. The channel impulse response waveform H(t) stored in the buffer 420 is being used by the RF wireless communications system 400 to perform time reversal procedures as described in FIGS. 2-3. H(t) is also referred to as the channel impulse response waveform of record.

Returning to FIG. 4, the comparator unit 430 can be used to quantify the differences between the latest detected channel impulse response waveform h(t) and the channel impulse response waveform H(t) of record. Changes between the two waveforms h(t) and H(t) which exceed a predetermined threshold trigger the replacement of the channel impulse response waveform H(t) of record with the most recently acquired channel impulse response waveform h(t). The comparator unit 430 has three terminals. The input 431 receives the channel impulse response waveform h(t) from the temporary buffer 410. The input 432 receives the channel impulse response waveform H(t) from the buffer 420. The procedure to quantify the difference between the two waveforms is described in detail with respect to FIGS. 5-6. Once the difference between the two waveforms is determined, an up-or-down bit is sent to the output 435 by the comparator unit 430 to activate the switch 450.

If the difference between the latest detected channel impulse response waveform h(t) and the channel impulse response waveform H(t) of record is less than a preset threshold then the switch 450 remains in its default OFF (open) position 455. Thus, the waveform h(t) remains stored in the temporary buffer 410 and the waveform H(t) remains stored in the buffer 420. In this situation, the previously acquired channel impulse response waveform H(t) remains the waveform of record.

If the difference between the latest detected channel impulse response waveform h(t) and the channel impulse response waveform H(t) of record is larger than a preset threshold then the switch 450 is set to its ON position 451. Thus, the waveform h(t) stored in the temporary buffer 410 is copied in the buffer 410. In this situation, the previously acquired channel impulse response waveform H(t) is being replaced with the latest detected channel impulse response waveform h(t). Thus, h(t) becomes the new channel impulse response of waveform of record, H(t)=h(t).

In other implementations, other mechanisms can be used for comparing the latest detected channel impulse response waveform h(t), with the previously acquired channel impulse response waveform H(t). Thus, the latest detected channel impulse response waveform h(t) can be selected when h(t) attains a sufficient difference from the previously acquired channel impulse response waveform H(t), according to some criterion derived from a comparison of the two signals. The comparison can be done with fully digital methods in microprocessor and memory or in comparator circuits.

The next emitted impulse-pulse 260 by the target-TX 210 is subjected to the same sequence of signal processing steps as the prior impulse-pulse.

As discussed earlier, when the channel impulse response h(t) changes slowly, the temporal and spatial focus at the target 204 degrades, therefore the time reversal based RF wireless communications also degrade.

Figure 5:
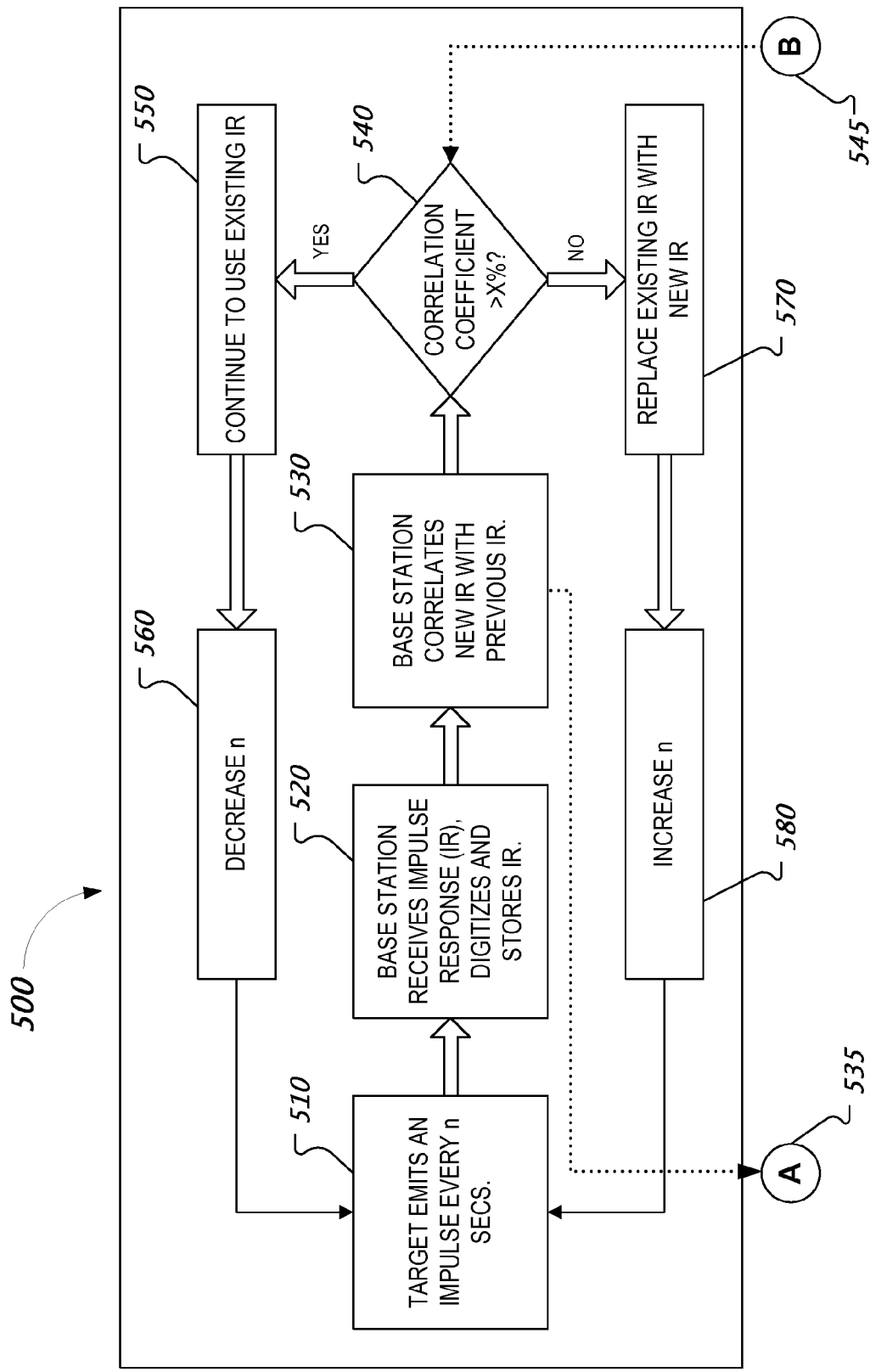
FIG. 5 is a block diagram of a process for monitoring the quality of an RF wireless transmission between a target and a base.

In FIG. 5 a method 500 to monitor the degradation of the channel impulse response is presented as a flow chart diagram. Method 500 is based on components of the monitoring channel described in regard to FIG. 4. Returning to FIG. 5, the degradation can be corrected, if the target repeatedly emits a pulse 260 which is then stored by the base as the channel impulse response waveform H(t)=$h_k$(t). Index k stands for the $k^{th}$ instance of the channel impulse response waveform. The base may switch over to retransmitting a new time reversed channel impulse response H(T−t) 270 based on monitoring how the newly acquired channel impulse response waveform $h_k$(t) compares to the channel impulse response waveform H(t) currently in use by the communication system.

Step 510 of method 500 shows that the target repeatedly emits impulse pulses which are transmitted to the base. The time interval between consecutive pulses can be set based on need, for example, about 1 s in some implementations. In step 520, the base receives a channel impulse response h(t) and stores the channel impulse response waveform $h_k$(t) in a temporary buffer. In step 530, the base correlates the newly acquired channel impulse response waveform with a previously acquired channel impulse response waveform H(t)=$h_{k-1}$(t). The previously acquired channel impulse response waveform H(t) is stored in a buffer at the base. During conditional step 540, the correlation coefficient is compared to a reference level (for example 95%). If the correlation coefficient is greater than the reference level then, in step 550, the base continues to use the older version of the channel impulse response H(t).

In step 560, the base also sends a message to the target to emit the impulse-pulses less often. The target may emit the impulse-pulses less often.

Returning to the conditional step 540, if the correlation coefficient is lower than the reference level, then at step 570 the base switches to use the newly acquired channel impulse response $h_k$(t). Furthermore, the channel impulse response waveform H(t) from the buffer is replaced with the channel impulse response waveform from the temporary buffer, H(t)=hk(t). In yet another implementation, the base also sends a message 580 to the target to emit the impulse-pulses more often. The target may emit the impulse-pulses more often.

In another exemplary implementation, to avoid the instabilities related to switching back-and-forth unnecessarily between low and high repetition, the base may perform correlations 530 back to several previously stored channel impulse response waveforms $H_k$(t), $H_{k-1}$(t), $H_{k-2}$(t), . . . . In one implementation the several previously stored channel impulse response waveforms are stored in additional buffers. In another implementation, the several previously stored channel impulse response waveforms are stored a single large capacity buffer.

To correlate two signals h1($t$) and h2($t$) a mathematical algorithm is applied to determine the degree of linear dependence between the signals. Perfect correlation means that (h1($t$)−h1($t$−Dt))/h1($t$−Dt)=(h2($t$)−h2($t$−Dt))/h2($t$−Dt) for all values of t, i.e., the fractional variation occurring in signal h1($t$) is perfectly matched by the same fractional change in signal h2($t$). The algorithm is normalized such that when two signals are identical, the correlation coefficient is ρ=1, when the signals are statistically independent ρ=0, and when the signals behave in the opposite manner, ρ=−1.

The correlation coefficient is further calibrated against a metric that characterizes the actual system performance. For example, in terms of a bit error rate (BER) at the base-RX 220, if the correlation coefficient ρ=85% corresponds to a BER of $10^{-15}$ this may be an acceptable ρ-value for indicating that the signals are identical. In contrast, if the correlation coefficient ρ=95% corresponds to a BER of $10^{-2}$ then the system may be more sensitive to small changes.

For the time reversal system illustrated in FIG. 4, it is important to detect relatively small changes from perfect correlation. The correlation coefficient ρ can be calibrated against the BER at the target. The log(log) nature of the BER (i.e. a small change in SNR at good SNR) provides sensitivity to the calibrated correlation coefficient.

Furthermore, comparison methods, other than correlation of channel impulse responses as described above, may be used in step 530 to determine when to change between the newly acquired channel impulse response and the stored channel impulse response. A metric and a comparison technique that directly relate system performance to information contained in the collected channel impulse response waveforms are presented in the next section.

The Signal-to-Interference Ratio (SIR) of a single data pulse convolved with the time reversed channel impulse response H(T−t) and measured at the receiver is a measure of how much the time reversal process realigns the scattered energy (signal) compared to the returning energy that is not properly realigned in time (interference). The channel impulse response waveform currently being used is denoted $H_n$. The SIR of $H_n$ is calculated as $$SIR_H = \frac{1}{1-H} \quad (4)$$

$$H = \frac{\sum_n (H_n H_n)^2}{\left(\sum_n H_n H_n\right)^2}$$

The newly captured channel impulse response waveform is denoted $h_n$. Similarly, the SIR of $h_n$ response is $$SIR_h = \frac{1}{1-h} \quad (5)$$

$$h = \frac{\sum_n (h_n h_n)^2}{\left(\sum_n h_n h_n\right)^2}$$

A hybrid SIR is defined as the SIR obtained by using the existing channel impulse response H, when the channel has actually changed to a new channel impulse response h. This combination is denoted Hh.

$$SIR_{Hh} = \frac{1}{1-Hh} \quad (6)$$

$$Hh = \frac{\sum_n (H_n h_n)^2}{\left(\sum_n H_n h_n\right)^2}$$

The metric of interest, denoted eta, compares the new SIR with the SIR expected from using the old H in the altered channel by calculating $$\eta = \frac{SIR_h}{SIR_{Hh}} \quad (7)$$

The ratio eta is greater than or equal to one since the best SIR is obtained by using the correct channel impulse response waveform for a given channel. However, there are cases where the old channel impulse response waveform may interact with a substantially different array of scatterers than the new one and produce an increase in SIR. An example of this situation is when the impulse-pulse emitted by the target 204 is too broad to fully resolve all the different scattering delays. This effect tends to reduce the signal component and increase the interference depending on how many of the scattering returns cannot be resolved. Changes in eta reflect changes in system performance, and hence a metric based on eta can stabilize a feedback control loop like the one described in method 500.

Ratio eta is also protected against configurations where high or low correlation may not correlate with a change in the system performance. For moderate channel changes various algorithms can be used to stabilize the feedback loop and to find an optimum update rate. For example, a threshold value of $eta_{th}=0.9$ for example produces approximately a 1 dB system penalty as the acceptable degradation. If the metric $q=eta-eta_{th}>0$ the old channel impulse response H(t) is kept and the update rate reduced. If q<0 then the new channel impulse response h(t) is switched and the update repetition increased. This feedback algorithm adjusts the feedback rate to maintain $eta-eta_{th}=0$. Note that if the base 202 continuously switches to the latest acquired channel impulse response h(t), whether necessary or no, the feedback algorithm cannot not effectively minimize the metric q.

In another implementation, the base can update the impulse response at every incoming pulse.

Discriminating Between Fast and Slow Changes of Channel Impulse Response

Sometimes the base may use the comparison procedure of step 530 described in regard to FIG. 5 to identify a response where parts of the system are changing and other parts are static. For example, there may be an environment rich in multipath and scattering elements, including a component that is changing rapidly, for example due to cars, aircraft, etc. At the same time, most of the multipath and scattering elements may be changing slowly or not at all. The multipath and scattering elements in the later category may be buildings, trees, fixed antennae and semi-static personnel etc.

A decrease in quality of the time reversal RF communication can occur when fast changing scattering elements are present in the transmission channel. The degradation manifests as a reduction in SNR at the receiving target, since not all scattering elements are now contributing to the signal returning to the target in phase. The correlation algorithm 535 described in FIG. 5 can discriminate between dynamic and static scattering elements.

Figure 6:
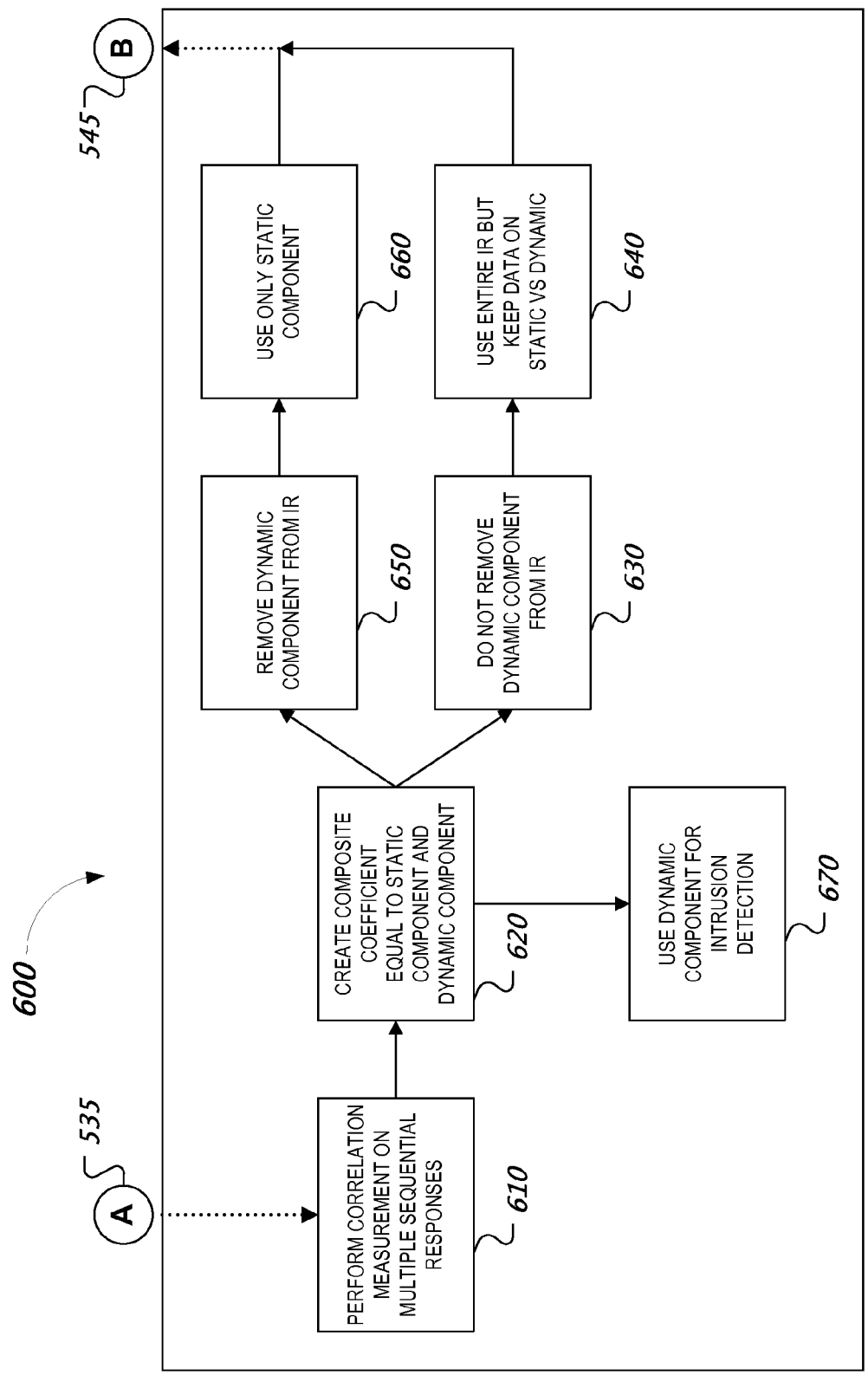
FIG. 6 is another block diagram of the process for monitoring the quality of an RF wireless transmission between a target and a base.

An exemplary implementation of such a method is illustrated schematically in FIG. 6. In this implementation, correlations between several previously stored channel impulse response waveforms $H_k(t)$, $H_{k-1}(t)$, $H_{k-2}(t)$, . . . are being performed in step 610. A composite correlation coefficient is calculated in step 620 corresponding to a statistically static component of the channel impulse response, and a dynamic component of the channel impulse response.

In many cases the channel impulse response may not be completely static or dynamic but consist of a summation of a static component and a dynamic component. If the dynamic component is due to rapidly moving or changing objects, the channel impulse response H(t) may change between the time an impulse response is recorded and the time it is sent back through the channel in a time reversed manner. If there is a static component however, that part will remain constant. In some cases only the component due to the static scatterers is extracted while the dynamic component is removed. This process improves the SIR such that only the pulses that can add to the peak in the returning signal are sent back to the target. There still is degradation in SIR since the returning signal is not perfectly matched to the channel impulse response.

On the other hand, for slowly changing channels, the dynamic part which represents the required update to the stored channel impulse response H(t) is included to ensure that the stored channel impulse response H(t) matches the actual channel impulse response h(t). In fact when the feedback control loop 500 mentioned earlier (see EQs. 4-7) is implemented, some dynamic change to the channel impulse response h(t) is necessary in order to keep H(t) updated. In this case the dynamic component is preserved. The signal is processed in order to examine the dynamic component. The dynamic component provides information on how fast the system is changing and what parts of the system are changing.

In other systems, like a radar type system, it is the dynamic component that is monitored and static background represents clutter and can be subtracted. Hence there is no simple algorithm that allows to predict when to remove or to use the dynamic component. Therefore any processing algorithm records the dynamic components even if they are subsequently not used.

An efficient processing algorithm captures multiple time series of the channel impulse response $h_k(t)$ and applies any computationally efficient cross-correlation algorithm designed to highlight only changing components. One example of a processing algorithm is to subtract values of each pair of curves at every sampling instant. The resultant curve only contains contributions from changing components. A new curve can be generated from these residuals or the squared residuals producing a curve with the dynamic elements. The curve containing only the elements that do not change substantially will represent the static components. Other algorithms can be used over multiple curves to get a clearer picture of the statistics of the changes.

The dynamic component may reveal important information. For example Doppler shifting is identified as a change in the width of the impulse-pulse emitted by the target 204, or of the carrier frequency if the impulse is an amplitude modulated carrier pulse. This may reveal the presence of a moving object and allows to infer its velocity. Over time a record can be built of the trends exhibited by the dynamic component and distinguish for example moving objects from simple changes in the reflective properties of objects.

The dynamic component of the channel impulse response can also monitor how rapidly a channel is changing. Information on changes in channel impulse response h(t) can be used to anticipate a future state of the system 400.

Returning to step 630 if method 600, the dynamic component is not separated from the channel impulse response $h_k(t)$. In step 640 the composite correlation coefficient is used to decide during conditional step 545 whether to keep the currently stored channel impulse response H(t) or not. Both static and dynamic components may be recorded in step 640 for future use.

In another implementation the dynamic component of the channel impulse response $h_k(t)$ is removed in step 650. Only the statistically static component of the channel impulse response contributes 660 to the correlation coefficient used to decide during conditional step 545 whether to keep the currently stored channel impulse response H(t) or not. The SNR at the target 204 increases since energy that does not contribute to signal but only to noise and interference has been removed. Furthermore in step 660, the base 202 controls the update repetition of the system 400 by the static component only which results in a more stable system. In this implementation, the update repetition is set to maintain only the static component of the channel impulse response.

In step 670, the dynamic component of the channel impulse response can be used 670 to indicate change in the channel impulse response. The dynamic component of the channel impulse response may be used in situations where it is important to monitor for changes in the environment, hence can be used as the basis of an intrusion detection system. The dynamic component of the channel impulse response may be particularly useful for detecting stealth objects which are designed to reflect energy in a direction other than directly back at an emitting source. In which case the only information that can be gathered arises from interaction with scatterers and changes in the scattering signatures.

Other Implementations of Monitoring of Channel Impulse Response

In another aspect, the target 204 can perform correlation of the returning impulse with the outgoing impulse. Performing the correlation step at the target 204, enables the target 204 to also recover the information about the transmission channel. Once the data is recovered, the target 204 now has a mechanism for analyzing any dynamic changes in the channel impulse response h(t). Unlike the base-RX 230 which receives impulse pulses at a relatively slow repetition, the target-RX 220 receives the equivalent of probe pulses at the much higher data rate. Hence the target 204 can resolve very small changes in the path channel impulse response h(t) very rapidly.

The criterion used by the target to determine the update repetition can either be a direct system performance measure, for example BER, performed at the target or a more complex evaluation of the channel impulse response performed at the base and transmitted to the target by embedding a message in the data or communicating out of band.

In another implementation, the system uses neural networking algorithms to learn the relationship between channel impulse response and system performance.

In another exemplary implementation, the base 202 may request the target 204 to signal at a higher than necessary rate to allow the base 202 to compare multiple responses in order to evaluate the degradation rate of the channel impulse response.

Data Transmission from Base with Multi Element Antenna to Multiple Targets

The implementations presented above refer to time reversal based RF wireless communications between a single target 204 and a base 202 equipped with a single element antenna, as illustrated in FIGS. 2-4. RF wireless communications involving more than one target and a transmission base with a multi-element antenna can also be implemented.

Figure 7:
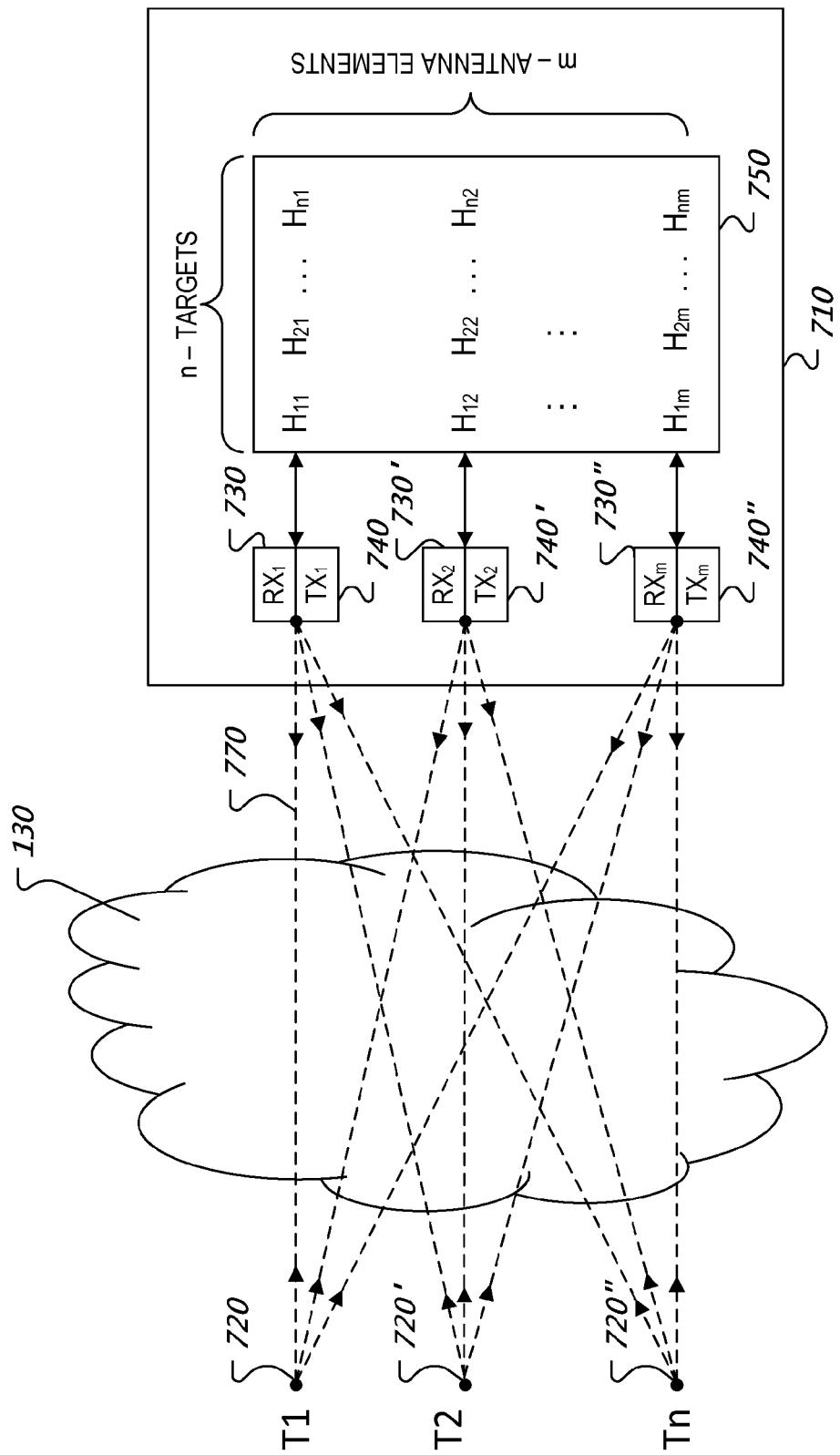
FIG. 7 is a schematic diagram illustrating an RF wireless communications system including several targets and a base.

In FIG. 7, a number of targets 720, 720', 720" can communicate with a base 710 configured to perform RF wireless communications based on time reversal. The base 710 is equipped with a multi-element antenna array 730-740, 730'-740', 730"-740". In analogy to FIG. 4, there exist two signal exchange paths between each target 720 and each element of the antenna array at the base. For example, each target 720 independently transmits a pulse to the base 710. The pulse 760 from target j 720 (where j=1, . . . , n) passes through the medium 130, interacts with scattering objects and arrives at a base 710.

In this implementation, each element i 730-740, 730'-740', 730"-740" (where i=1, . . . , m) of the antenna array records the channel impulse response $h_{ij}(t)$ of the transmission path between target j 720 and element i 730-740.

Each element i is coupled with a waveform processing unit 750. The waveform processing unit 750 digitizes the channel impulse response $h_{ij}(t)$ in a high speed sampling circuit. The sampling circuitry may be collocated at one location within the base 710. Hence the different distances and delays of the antenna elements can be recorded as part of the appropriate channel impulse $H_{ij}(t)$ response and be removed by the time reverse process.

Then, the waveform processing unit 750 time reverses the signal and stores the channel impulse response $H_{ij}(t)$ in the memory, for each antenna element i 730-740. Among other things, the waveform processing unit 750 monitors an m×n matrix of waveforms, where each element of the matrix contains a channel impulse response waveform Hij(t). For example, each element i of the antenna array monitors n waveforms, corresponding to the n targets the element communicates with.

The antenna array 730-740 retransmits each time reversed channel impulse response $H_{ij}(T-t)$ as an analog signal. As discussed earlier, assuming that the medium 130 is linear and reciprocal, the signal arrives at the target 720 without being affected by the noise caused by the multipath transmission channel 130. According to the transmission method described in regard to FIG. 3, a data stream originating at antenna element i 730-740 and intended to arrive at target j 720 is convolved with the time reversed channel impulse response $H_{ij}(T-t)$ prior to emission.

In addition to the independent operation mode involving transmission from one target 720 to one element of the antenna array (as described above), the base 710 can operate in a partially coordinated mode (i.e. groupings of antenna elements), or in a fully coordinated mode. While operating in any coordinated mode, the base 710 can effectively focus the signal temporally and spatially at the correct target 720 as long as the channel impulse response H(t) of each target 720 is available at each element of the antenna array at the base 710. Note that the elements of the antenna array work in a coordinated manner to send a specific stream of data to a target, in order to avoid an overlap of independent or uncoordinated data streams overlapping at the target, as described below.

Each of the m elements of the antenna array uses the respective channel impulse response $H_{i1}(t)$ to simultaneously send data to target j=1. Each channel impulse response $H_{i1}(t)$ is time reversed with respect to a common synchronized reference time T, i.e. $H_{i1}(T-t_{i1})$, and then added to each bit of a data stream prepared for transmission to target j=1. Therefore, the emitted signals from each antenna array element i are properly synchronized so that the antenna array spatially and temporally focuses all the signals back to a single target, namely target j=1 in this case. Thus, the time reversal process enables creating a directional antenna with no requirement to steer or aim the antenna array. The time reversed channel impulse response $H_{i2}(T-t_{i2})$ can also be sent simultaneously but with a different data stream by simply adding at each antenna element i the time reversed channel impulse response $H_{i2}(T-t_{i2})$ to each bit of the digital stream corresponding to target 2. Once again, the time reversal process enables that the data indexed for target 1 reaches target 1 and the data indexed for target 2 reaches target 2 and so on.

When multiple elements of the antenna array communicate to a specific target, the same feedback technique 500 as described (in FIG. 5) for a single pair can be used. Moreover, a target 720 is instructed to emit impulse-pulses less often only when the threshold-based comparison 540 that triggers a decrease in repetition applies to each element of the antenna array. Alternately, a target 720 is instructed to emit impulse-pulses more often as soon as the threshold-based comparison 540 that triggers an increase in repetition applies to at least one element of the antenna array.

An exemplary procedure to determine the order in which the base 710 receives impulse-pulses 760, 760', 760", . . . from the respective targets 720, 720', 720", . . . is presented below. The base station 710 transitions to silence or a given regular code pattern. This activates each target 720 to send a preprogrammed impulse sequence, for example a sequence of pulses of different pulse widths. The base 710 can detect how many targets 720 are operating. The base 710 can then signal with silence or activation code to silence the targets 720. Each target 720 is given a default queuing index that instructs the target 720 how long to wait after an activation code. Each target 720 then sends an impulse 760 and waits for an acknowledgment signal from the base 710.

If the target 720 has successfully transmitted an impulse 760, the acknowledgement signal from the base 710 returns to the target 720 in the form of a narrow pulse. The receipt by the target 720 of the narrow pulse completes the setup of target 720. The second target 720' is activated and repeats this process. Eventually all targets 720, 720', 720", . . . are initialized and the base 710 signals to each to start communications with a regular update. If a target detects a degradation of performance, the target can emit impulse-pulses more often until the reception performance at the target reaches an acceptable performance level.

In another aspect, an RF system for providing RF communications includes a target and a base in communication with the target. The target has a target-transmitter to repeatedly emit RF impulse-pulses and a target-receiver to detect RF data signals. The base includes a base-detector to detect a channel impulse response of the RF impulse-pulses emitted by the target. The base-detector has an analog-to-digital converter to digitize the detected channel impulse response into a detected channel impulse response waveform having a preset number of samples. The base also includes a waveform processing unit. The waveform processing unit includes a temporary memory configured to store the detected channel impulse response waveform and a first memory configured to store and reverse in time domain a previously detected channel impulse response waveform. The waveform processing unit also has a comparator unit to quantify a difference between the channel impulse response waveform in the temporary memory and the channel impulse response waveform in the first memory, and a switch to replace the channel impulse response waveform stored in the first memory with the channel impulse response waveform stored in the temporary memory. The quantified difference is compared against a predefined threshold. The base further includes a multiplexer that adds a copy of the time reversed channel impulse response waveform from the first memory at the beginning of each bit of an RF data stream to produce an output signal, and a transmitter to emit the output signal.

In another aspect, an RF wireless communication method includes emitting from a target an impulse-pulse and detecting at a base a channel impulse response associated with the emitted impulse-pulse. The method further includes digitizing the detected channel impulse response into a channel impulse response waveform and storing the channel impulse response waveform in a memory at the base. An RF data stream transmission, using the monitored channel impulse response, includes reversing in time domain the channel impulse response waveform from the memory, then preparing a signal for transmission by adding a copy of the time reversed channel impulse response waveform at the beginning of each bit of an RF data stream, and finally emitting the prepared signal from the base. Next, the method includes detecting the RF data stream at the target. When a parameter of system performance is less than a first threshold another impulse-pulse is emitted from the target. The parameter of system performance can be a bit-to-error-ratio of the detected RF data stream at the target.

The above technical description refers to the impulse response being generated by a node emitting an 'impulse', which is normally understood to be a mathematical "delta" function. This is merely the simplest signal from which the impulse response can be derived. Other signals which can be realized in practice can be used, for example, one pulse or a sequence of pulses where the pulses are the narrowest pulse consistent with a Nyquist receiver, which is a receiver that is designed for optimum signal to noise ratio. These pulses can be optimized for recovery of the signals in a specialized noise environment or simply to enable noise to be averaged from the recovered impulse response. Different shaped pulses may also be employed. The most likely variant of pulse shape from a simple narrow pulse like a Gaussian pulse is a pulse shaped by the transmit filter function and the emitting antenna which may broaden the pulse and differentiate the current fed to the antenna with respect to time. To deconvolve the impulse response from the actual received signal, the node which is responsible for time reversing the impulse response can use the employed pulse shape or sequence, and the receiver filter response.

Although a few variations have been described in detail above, other modifications are possible. For example, the logic flow depicted in the accompanying figures and described herein does not require the particular order shown, or sequential order, to achieve desirable results.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations, enhancements and other implementations can be made based on what is described and illustrated in this document.

What is claimed is:

1. A method for communicating between a base and a target with reduced signal degradation based on time reversal of a channel impulse response waveform representing signal propagation between the base and the target, comprising:
   obtaining a channel impulse response for an RF communication system for wireless RF communications between a base and a target, wherein the obtaining comprises:
      repeatedly emitting from the target impulse-pulses;
      detecting at the base a channel impulse response associated with the emitted impulse-pulses;
      digitizing the detected channel impulse response into a channel impulse response waveform; and
      storing the channel impulse response waveform in a temporary memory at the base;
   monitoring the obtained channel impulse response, wherein the monitoring comprises:
      obtaining a difference between a channel impulse response waveform stored in a first memory and the channel impulse response waveform stored in the temporary memory;
      updating the channel impulse response waveform stored in the first memory with the channel impulse response waveform stored in the temporary memory when the obtained difference is greater than a predefined threshold;
   transmitting an RF data stream by using the monitored channel impulse response, wherein the transmitting comprises:
      reversing in time domain the channel impulse response waveform from the first memory;
      preparing a signal for transmission by adding a copy of the time reversed channel impulse response waveform to each bit of an RF data stream;
      emitting the prepared signal from the base;
      detecting the RF data stream at the target; and
   wherein the updating further comprises:
      instructing the target to emit the impulse-pulses more often when the obtained difference is greater than the predefined threshold; and
      instructing the target to emit the impulse-pulses less often when the obtained difference is smaller than the predefined threshold.

2. The method as in claim 1, wherein obtaining the difference comprises:
   calculating a correlation coefficient between the channel impulse response waveform stored in the first memory and the channel impulse response waveform stored in the temporary memory.

3. The method as in claim 1, wherein obtaining the difference comprises:
   calculating a parameter indicative of reception performance at the target, wherein the parameter comprises:
      a ratio of a signal-to-interference ratio (SIR) based on the channel impulse response waveform stored in the first memory; and
      an SIR based on the channel impulse response waveform stored in the temporary memory.

4. The method as in claim 1, wherein obtaining the difference comprises:
   extracting static and dynamic components of the channel impulse response waveform stored in the first memory;
   extracting static and dynamic components of the channel impulse response waveform stored in the temporary memory; and
   calculating a composite correlation coefficient between the extracted components of the channel impulse response waveform stored in the first memory and the extracted components of the channel impulse response waveform stored in the temporary memory.

5. The method as in claim 4, further comprising
determining a difference between the static component of the channel impulse response waveform stored in the first memory and the channel impulse response waveform stored in the temporary memory.

6. The method as in claim 4, further comprising
determining a difference between the dynamic component of the channel impulse response waveform stored in the first memory and the dynamic component of the channel impulse response waveform stored in the temporary memory.

7. The method as in claim 1, wherein obtaining the difference further comprises:
   averaging a set of most recent channel impulse response waveforms stored in the first memory; and
   obtaining a difference between the averaged channel impulse response waveform and the channel impulse response waveform stored in the temporary memory.

8. The method as in claim 7, wherein the set includes at least three of the most recent channel impulse response waveforms stored in the first memory.

9. The method as in claim 1, further comprising:
   monitoring channel impulse response waveforms associated with the target and antenna elements at the base;
   instructing the target to emit the impulse-pulses more often when at least one monitored channel impulse response waveform is being updated; and
   instructing the target to emit the impulse-pulses less often when no monitored channel impulse response waveform is being updated.

10. The method as in claim 1, further comprising:
   maintaining a separate monitoring schedule for each target in communication with the base.

11. The method as in claim 1, the transmitting the RF data stream further comprises:
   synchronizing time reversed channel impulse response waveforms corresponding to a set of antenna elements at the base prior to emission of the RF data stream to a specific target.

* * * * *